(12) United States Patent
Huang et al.

(10) Patent No.: US 7,527,103 B2
(45) Date of Patent: May 5, 2009

(54) PROCEDURES AND COMPOSITIONS FOR RESERVOIR PROTECTION

(75) Inventors: Tianping Huang, Spring, TX (US); James B. Crews, Willis, TX (US)

(73) Assignee: Baker Hughes Incorporated, Houston, TX (US)

( * ) Notice: Subject to any disclaimer, the term of this patent is extended or adjusted under 35 U.S.C. 154(b) by 154 days.

(21) Appl. No.: 11/754,786

(22) Filed: May 29, 2007

(65) Prior Publication Data
US 2008/0296024 A1     Dec. 4, 2008

(51) Int. Cl.
*E21B 21/00*  (2006.01)
*E21B 37/00*  (2006.01)
*E21B 37/08*  (2006.01)

(52) U.S. Cl. ............... 166/311; 166/205; 166/300; 166/317; 166/376

(58) Field of Classification Search ............... 166/205, 166/317, 376
See application file for complete search history.

(56) References Cited

U.S. PATENT DOCUMENTS

| | | | |
|---|---|---|---|
| 3,057,405 A * | 10/1962 | Mallinger | 166/288 |
| 5,224,556 A | 7/1993 | Wilson et al. | |
| 5,287,923 A | 2/1994 | Cornette et al. | |
| 5,320,178 A | 6/1994 | Cornette | |
| 5,964,295 A | 10/1999 | Brown et al. | |
| 5,979,555 A | 11/1999 | Gadberry et al. | |
| 6,059,032 A | 5/2000 | Jones | |
| 6,239,183 B1 | 5/2001 | Farmer et al. | |
| 6,394,185 B1 | 5/2002 | Constien | |
| 6,543,539 B1 | 4/2003 | Vinegar et al. | |
| 6,543,545 B1 | 4/2003 | Chatterji et al. | |

(Continued)

FOREIGN PATENT DOCUMENTS

GB          728197        4/1955

(Continued)

OTHER PUBLICATIONS

Baker Hughes, TELEPERF™ Technology, 2006, available from http://www.bakerhughes.com/bot/sand_control/products_teleperf.htm.

(Continued)

*Primary Examiner*—Zakiya W Bates
*Assistant Examiner*—Angela M DiTrani
(74) *Attorney, Agent, or Firm*—Madan Mossman & Sriram PC

(57) ABSTRACT

A flow conduit having at least one orifice is placed in the vicinity of a flow source, which in one non-limiting embodiment may be a hydrocarbon reservoir. The flow pathway between the orifice and the source is temporarily blocked with a degradable barrier. Once the flow pathway is physically placed, the degradable barrier is removed under the influence of an acid, a solvent, time and/or temperature. The flow source and the flow pathways are at least partially covered (and flow blocked by) a temporary coating such as a pseudo-filter cake formed by a viscoelastic surfactant-gelled aqueous drill-in fluid, and the flow conduit is extended to the flow source. The pseudo-filter cake is removed when viscosity is reduced by an internal breaker, and flow is then allowed. The method is useful in one context of recovering hydrocarbons where the flow conduit is a telescoping sleeve or tube that contacts the borehole wall.

35 Claims, 8 Drawing Sheets

U.S. PATENT DOCUMENTS

| | | | |
|---|---|---|---|
| 6,605,570 B2 * | 8/2003 | Miller et al. ................ | 507/211 |
| 6,831,044 B2 | 12/2004 | Constien | |
| 7,052,901 B2 | 5/2006 | Crews | |
| 7,461,699 B2 * | 12/2008 | Richard et al. .............. | 166/376 |
| 2004/0231845 A1 | 11/2004 | Cooke, Jr. | |
| 2005/0065037 A1 | 3/2005 | Constien | |
| 2005/0092363 A1 | 5/2005 | Richard et al. | |
| 2005/0252658 A1 | 11/2005 | Willingham et al. | |
| 2006/0041028 A1 | 2/2006 | Crews | |
| 2006/0211775 A1 | 9/2006 | Crews | |
| 2006/0211776 A1 | 9/2006 | Crews | |
| 2007/0056737 A1 | 3/2007 | Crews et al. | |

FOREIGN PATENT DOCUMENTS

| | | |
|---|---|---|
| WO | 9805734 | 2/1998 |

OTHER PUBLICATIONS

Baker Hughes, TELEPERF™ Technology, 2006, available from http://www.bakerhughes.com/bot/sand_control/products_teleperf_intro.htm.

H.A. Nasr-El-Din, et al., "Lessons Learned and Guidelines for Matrix Acidizing With Viscoelastic Surfactant Diversion in Carbonate Formations," SPE 102468, pp. 1-11, 2006 SPE Annual Technical Conference & Exhibition, Sep. 24-27, 2006.

H.A. Nasr-El-Din, et al., " Acid Fracturing of Deep Gas Wells Using a Surfactant-Based Acid: Long-Term Effects on Gas Production Rate," SPE 102469, pp. 1-12, 2006 SPE Annual Technical Conference & Exhibition, Sep. 24-27, 2006.

* cited by examiner

FIG. 4 - Leakoff tests with 400md ceramic disc at 250°F (121°C) and 300psi (2.1 Mpa) (Base Fluid: 13.0ppg (1.6 kg/l) CaCl2/CaBr2 + 4%WG-3L + 6pptg (0.7 kg/m3) VES-STA + 1gptg GBW-407L)

FIG. 6 -
400 md Disc Leakoff Test at 250°F (121°C) and 300 psi (2.1 MPa) with VES Fluid System FIG. 7 - Regain Perm Tests with 100md range Berea cores at 200°F (93°C)
Base Fluid: 10.8ppg (1.3 kg/l) CaCl2 + 4% WG-3L + 2pptg (0.2 kg/m3) VES-STA1 + 2gptg GBW-407L

Internally Broken VES Fluid

PROCEDURES AND COMPOSITIONS FOR RESERVOIR PROTECTION

TECHNICAL FIELD

The present invention relates to methods and compositions for protecting a reservoir from damage during drilling-in, completion and production operations, and more particularly relates, in one embodiment, to methods and compositions for inhibiting or preventing reservoir damage using a drill-in fluid gelled with a viscoelastic surfactant.

TECHNICAL BACKGROUND

There are a number of procedures and applications that involve the formation of a temporary seal, coating or plug while other steps or processes are performed, where the seal, coating or plug must be later removed. Often such seals or plugs are provided to temporarily inhibit or block a flow pathway or the movement of fluids or other materials, such as flowable particulates, in a particular direction for a short period of time, when later movement or flow is desirable.

A variety of applications and procedures where temporary coatings or plugs are employed are involved in the recovery of hydrocarbons from subterranean formations where operations must be conducted at remote locations, namely deep within the earth, where equipment and materials can only be manipulated at a distance. One particular such operation concerns perforating and/or well completion operations incorporating filter cakes and the like as temporary coatings.

Perforating a well involves a special gun that shoots several relatively small holes in the casing. The holes are formed in the side of the casing opposite the producing zone. These communication tunnels or perforations pierce the casing or liner and the cement around the casing or liner. The perforations go through the casing and the cement and a short distance into the producing formation. Formations fluids, which include oil and gas, flow through these perforations and into the well.

The characteristics and placement of the communication paths (perforations) can have significant influence on the productivity of the well. Therefore, a robust design and execution process should be followed to ensure efficient creation of the appropriate number, size and orientation of perforations. A perforating gun assembly with the appropriate configuration of shaped explosive charges and the means to verify or correlate the correct perforating depth can be deployed on wireline, tubing or coiled tubing.

It would be desirable if the communication paths of the perforations could be temporarily blocked, filled or plugged while other operations are conducted that would cause problems if the perforations were left open. Such problems include, but are not necessarily limited to, undesirable leakoff of the working fluid into the formation, and possible damage to the formation.

The filter cake that is often deposited temporarily on the wellbore wall has been conventionally formed by using hydratable polymers, such as polysaccharides which increase the viscosity of the fluid, and/or other particles that filter out against the pores of the formation. However, a common problem with using polymer-based gelled fluids is that upon removal from the wellbore face damage occurs to the pores of the formation and permeability is reduced, which in turn compromises the wells' ability to flow hydrocarbons.

It would be desirable if the communication paths of the perforations could be temporarily blocked, filled or plugged while other operations are conducted that did not risk damage to the formation, or that greatly reduced any damage that does occur.

SUMMARY

In carrying out these and other objects of the invention, there is provided, in one non-limiting form, a method for protecting a subterranean reservoir during drilling that involves drilling a well through a subterranean reservoir using a drill-in fluid and a pipe. The drill-in fluid includes water, at least one viscoelastic surfactant (VES) in an amount effective to increase the viscosity of the water, at least one internal breaker, at least one VES stabilizer, at least one viscosity enhancer, and at least one fluid loss control agent. The pipe includes an interior space, an outer surface, and at least one flow conduit between the interior space and the outer surface. In one non-limiting embodiment, the flow conduit is a telescoping sleeve or tube. The flow conduit bears within it a degradable barrier, and the flow conduit is in a retracted position at least partially within the interior space. A drill-in fluid forms a temporary coating (in a non-limiting embodiment, a pseudo-filter cake) over at least a portion of the wellbore wall. The method further involves positioning the pipe within a wellbore that has a wellbore wall at the subterranean reservoir. The degradable barrier is removed from the flow conduit, in one non-limiting embodiment by a fluid such as an acid, solvent and/or by temperature or time. Hydraulic pressure of a fluid, such as or similar to the drill-in fluid previous described, is supplied within the interior space of the pipe and the flow conduit and forms a temporary barrier (e.g. a second pseudo-filter cake) in the flow conduit, and is applied to extend the flow conduit in the direction of the wellbore wall. The temporary barrier is removed from the flow conduit to at least partially open the flow conduit. The temporary coating on the well bore wall adjacent the flow conduit is removed, such as by reducing the viscosity of the drill-in fluid. It will be appreciated that the method described above is not necessarily limited to the sequence of the various processes described, and that the method could be practiced effectively with a different sequence of processes or steps.

Figure 1:
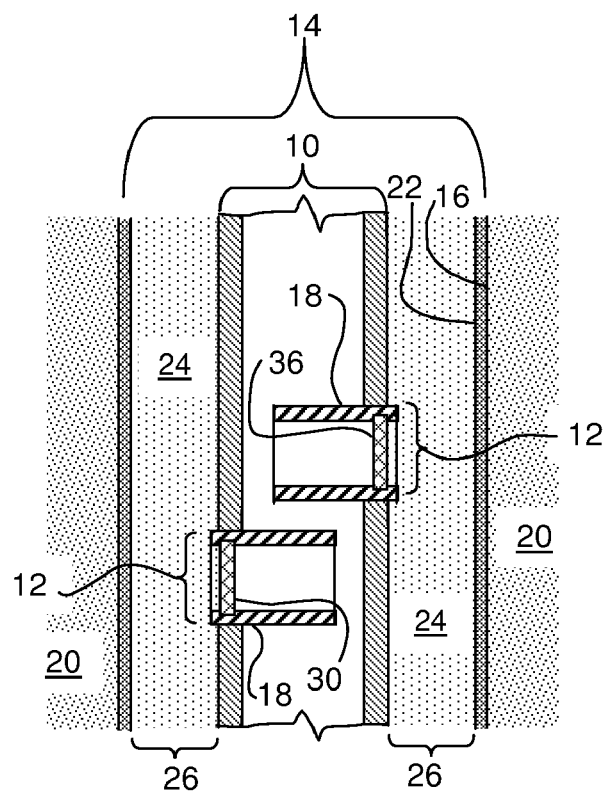
FIG. 1 is a cross-section schematic view of an oil well casing or conduit in a borehole having two sleeves or tubes, one on either side of the casing, each in a retracted position in an orifice in the casing and having a degradable barrier therein, and showing a pseudo-filter cake deposited by the drill-in fluid containing a viscoelastic surfactant (VES) on the wellbore wall.
Figure 2:
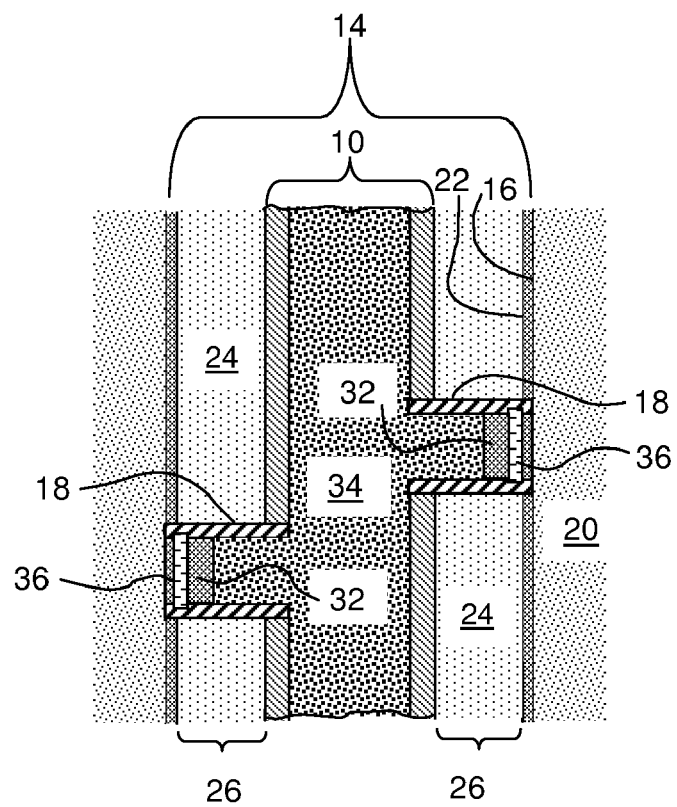
FIG. 2 is a cross-section schematic view of the oil well casing in the wellbore of FIG. 1 having two flow pathways on either side thereof, where the sleeves or tubes have been extended or expanded in the direction of the wellbore wall bearing the pseudo-filter cake on the borehole wall adjacent to the reservoir, and where a pseudo-filter cake is also placed on man-made porous media, such as a metal bead bed inside of telescoping tube after the degradable barrier is degraded and removed.
Figure 3:
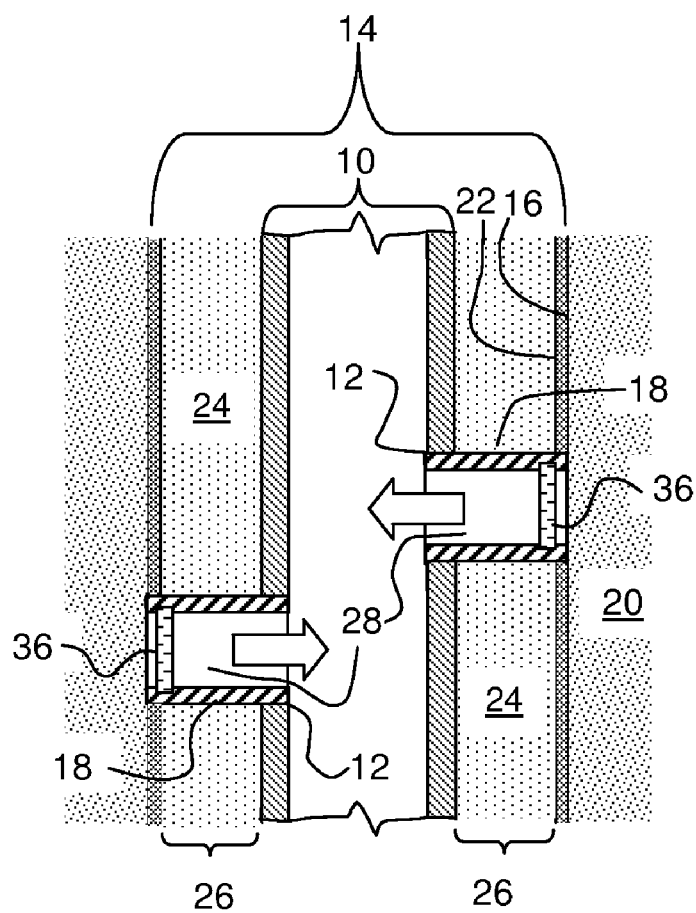
FIG. 3 is a cross-section schematic view of the oil well casing in the wellbore of FIG. 1 where the pseudo-filter cakes and the degradable barrier in the flow pathways have been removed, and hydrocarbons may flow from the reservoir into the casing.

It will be appreciated that FIGS. 1-3 are schematic illustrations and are not to scale, and that details that would be present in an actual implementation of the methods and apparatus herein have been removed or simplified for the purposes of clear illustration.

DETAILED DESCRIPTION

Methods, procedures and compositions have been discovered for reservoir protection from formation damage using VES-gelled aqueous fluids as drill-in fluids. The methods and compositions avoid, inhibit or mitigate reservoir damage generated from drilling-in, completion and production operations. A drill-in fluid is one designed particularly for drilling through the reservoir section of a wellbore, such as a hydrocarbon bearing reservoir. The reasons for using a specially designed mud include: drilling the reservoir zone successfully, minimizing damage and maximizing production of the exposed zones, facilitating the well completion, which may include complicated procedures. Drill-in fluids conventionally resemble completion fluids, and may be brines that contain only the selected solids of appropriate particle size ranges (e.g. salt crystals or calcium carbonate) and polymers. However, as noted, polymers form a filter cake on and often within the pores of a wellbore face, and the structure and permeability of the wellbore may be damaged when a polymer-formed filter cake is removed.

However, the present methods and compositions utilize, in one non-limiting embodiment, viscosity-enhanced VES-gelled aqueous fluids, also containing fluid loss control agents, VES stabilizers, viscosity enhancers and internal breakers, to form a temporary barrier and drill-in fluid pseudo-filter cake for oil well, gas well or injection well completion methods. As noted elsewhere herein, the method is not limited to this particular embodiment. In one non-restrictive version of the completion method, a barrier, collar, sleeve, plug, conduit, or tube, possibly containing a specially sized gravel pack material or filter structure (e.g. a screen) and run on the casing or liner in place, is placed between a pseudo-filter cake or other type of coating or membrane on the borehole wall and an orifice in the casing. Once placed, the pseudo-filter cake is removed for production to occur, or alternatively for injection to take place into the reservoir if the well is an injection well. The production or injection would include fluid flow through the collar, sleeve, plug or tube as well as through the casing or liner or other pipe. Alternatively, production or injection would take place through a pathway that supplants the barrier, collar, sleeve, plug or tube, such as one formed from cement, if used. A typical approach would be to pump chemicals through or adjacent to the barrier, collar, sleeve, plug, conduit, or tube, to dissolve the pseudo-filter cake or sealing membranes. That is, the collar, sleeve, plug, tube, conduit or barrier is left in place to channel fluids therethrough. Concerns in such a process include, but are not necessarily limited to, the inability of a separate chemical, substance, breaker or fluid to reach the pseudo-filter cake itself, incomplete coverage of the pseudo-filter cake or sealing membrane surface, loss of some or all chemical to the formation through the pathways that do open up, and the formation of damaging residues in or on the reservoir. However, such concerns are greatly reduced in the method herein as compared to prior methods used.

In one non-limiting embodiment herein, the sleeves, tubes, or conduits are completely or at least partially blocked by barriers made of a degradable material that degrades or disintegrates into a product or substance that optionally in turn removes the pseudo-filter cake or membrane between the sleeve, conduit or tube and the wellbore wall. This method would further eliminate and/or minimize many of the problems previously mentioned. It will be further appreciated that when the degradable barrier is in place to perform its blocking function, that it is not strictly necessary for the barrier to seal or make liquid-tight the flow pathway for it to effectively function.

Suitable degradable materials that fill or coat the metal bead bed (or other porous media) within the sleeves, tubes or conduits include, but are not necessarily limited to biodegradable polymers that degrade into acids. One such polymer is PLA (polylacetic acid) polymer 4060D from NatureWorks™, a division of Cargill Dow LLC. This polymer decomposes to lactic acid with time and temperature, which not only dissolves the pseudo-filter cake trapped between the sleeve, tube or barrier and the borehole wall, but can stimulate the near flow pathway area of the formation as well. TLF-6267 polyglycolic acid (PGA) from DuPont Specialty Chemicals is another polymer that degrades to glycolic acid with the same functionality. Other polyester materials such polycaprolactams and mixtures of PLA and PGA degrade in a similar manner and may provide similar pseudo-filter cake removing functionality. Solid acids, for instance sulfamic acid, trichloroacetic acid, and citric acid, in non-limiting examples, held together with a wax or other suitable binder material may also be suitable. In the presence of a liquid and/or elevated temperature the binder would be dissolved or melted and the solid acid particles liquefied and already in position to optionally and locally contact and remove the pseudo-filter cake from the wellbore face and optionally to acid stimulate the portion of the formation local to the flow pathway. In general, it is also or alternatively expected that the pseudo-filter cake generally degrades or has its viscosity reduced by internal breakers present therein without the need for an external agent such as acid, solvent or other substance, whether or not such external agent is a product generated by the degradation of the degradable barrier or separate supplied.

Polyethylene homopolymers and paraffin waxes are also expected to be useful materials for the degradable barriers in the method herein. Products from the degradation of the barrier include, but are not necessarily limited to, acids, bases, alcohols, carbon dioxide, combinations of these and the like. Again, it should be appreciated that these temporary barriers degrade or disintegrate in place, as contrasted with being removed whole. The temporary barriers herein should not be confused with conventional cement or polymer plugs used in wells.

There are other types of materials that can function as barriers or plugs and that can be controllably removed. Polyalkylene oxides, such as polyethylene oxides, and polyalkylene glycols, such as polyethylene glycols, are some of the most widely used in other contexts. These polymers are slowly soluble in water. The rate or speed of solubility is dependent on the molecular weight of these polymers. Acceptable solubility rates can be achieved with a molecular weight range of 100,000 to 7,000,000. Thus, solubility rates for a temperature range of 50° to 200° C. can be designed with the appropriate molecular weight or mixture of molecular weights.

In one non-limiting embodiment herein, the degradable material degrades over a period of time ranging from about 1 to about 240 hours. In an alternative, non-limiting embodiment the period of time ranges from about 1 to about 120 hours, alternatively from 1 to 72 hours. In another non-restrictive version herein, the degradable material degrades over temperature range of from about 50° to about 200° C. In an alternative, non-limiting embodiment the temperature may range from about 50° independently to about 150° C. Alternatively, the lower limit of these ranges may be about 80° C. Of course, it will be understood that both time and temperature may act together to degrade the material. And certainly the use of water, as is commonly used in drilling or completion fluids, or some other chemical, could be used alone or together with time and/or temperature to degrade the material. Other fluids or chemicals that may be used include, but are not necessarily limited to alcohols, mutual solvents, fuel oils such diesel, and the like. In the context of the methods and compositions herein, the degradable barrier is considered substantially soluble in the fluid if at least half of the barrier is soluble therein or dissolves therein.

The telescoping tube, sleeve or conduit contains a filter structure therein, such as a screen, a bead bed or other man-made porous media, e.g. specially-sized stainless steel beads in a filtration media or other sand control media that bears or is at least partially coated by or covered with the degradable barrier material.

In an embodiment of the methods and procedures herein, the drill-in fluid may be circulated within the pipe, casing, liner or tubing and deposits a VES-based pseudo-filter cake on the filter structure (i.e. stainless steel beads) of the telescoping tubes. The drill-in fluid may be the same or different as that used in the annulus to form the pseudo-filter cake on the borehole wall. This interior or central or extension drill-in fluid (or other fluid) is the same which under hydraulic pressure extends or causes the flow conduits, sleeves or tubes to telescope outward in the direction of the wellbore wall, and in most cases contact the wall.

It will be understood that the method herein is considered successful if the degradable material disintegrates or degrades sufficiently to open up the flow conduit, tube or sleeve to fluid flow, and optionally generates a product that will remove sufficient pseudo-filter cake, which is placed by the drill-in fluid, to permit flow through the pathway. That is, the inventive method is considered effective even if not all of the degradable material disintegrates, degrades, dissolves or is displaced and/or not all of the pseudo-filter cake across the fluid pathway is removed. In an alternative, non-limiting embodiment, the method is considered successful if at least 50% of the degradable material is disintegrated and/or at least 50% of the pseudo-filter cake across or within the fluid pathway is removed, and in yet another non-restrictive embodiment if at least 90% of either material in the flow pathway is disintegrated, removed or otherwise displaced. Either of these rates of removal may be considered "substantial removal" in the context of this invention. However, as noted previously, the pseudo-filter cake itself may contain an internal breaker that disrupts or disturbs the elongated or rod-like micelles of the pseudo-filter cake, and thus it may not be necessary in many embodiments for the degradable material to degrade into products that affect the pseudo-filter cake at all.

TELEPERF™ is one embodiment of the degradable barrier technology described above that is available from Baker Oil Tools as completion tubing, and the VES-gelled aqueous fluid technology DIAMOND VES part of the DIAMOND FRAQ™ technology of Baker Oil Tools has been discovered to be useful when used together. The DIAMOND VES fluid technology may be useful in kill pills and completion fluids. The VES fluids contain optimized combinations of at least one viscoelastic surfactant, brine, at least one internal breaker, at least one fluid loss control agent, at least one VES stabilizer, at least one viscosity enhancer and optionally a gas hydrate inhibitor. In one non-limiting embodiment, the packing materials or degradable barriers used to initially plug and protect the TELEPERF™ flow conduits from a completion fluid or formation fluid flowing into the TELEPERF™ pipe or tubing may be either acid soluble, solvent soluble or both.

During drilling of the producing zone with a VES-gelled drill-in fluid system, the viscosity enhancers therein may associate the elongated or "rod-like" micelles through mechanisms such as surface charge attraction and/or surface adsorption to build a unique pseudo-filter cake on the formation face to protect foreign fluid and solids from leaking off into the producing formation, in one non-limiting explanation of how the methods herein operate. This "association", "connection" or "networking" of the VES micelles improve or help maintain viscosity of the fluid and its ability to form pseudo-filter cake. This association is analogous to, but different from, crosslinking that may occur with polymer thickening agents.

After drilling through a producing zone, the TELEPERF™ structure would be used as a completion tubular to avoid using a cementing and perforation process. After the TELEPERF™ assembly is in place across the producing zone location, the TELEPERF™ plugs or degradable barriers may be removed or degraded or cleaned up using an acid and/or solvent clean-up fluid to remove this material in the flow conduit or pathways. A VES-gelled fluid is used as an extension fluid which will build a pseudo-filter cake on the TELEPERF™ flow conduits or pathways to then allow build up of high enough hydraulic pressure to extend or telescope out the TELEPERF™ flow conduits or pathways to contact the producing formation.

As will be discussed in more detail, the process of internally breaking the VES micelle structure is now controllable. When internal breakers disrupt the VES micelles and/or convert them or rearrange the surfactant molecules into more spherical shapes (in contrast to the "worm-like" or "rod-like" micelles characteristic of increased viscosity), the pseudo-filter cake will then break into broken VES and the small fluid loss control particles. The fluid loss control agents, which as discussed are often slowly water soluble, will be dissolved by and/or flowed back with the producing fluids. After breaking the VES micelles, the viscosity of the entire fluid system is dramatically reduced. The broken fluid is easy to flow back with the producing fluid and generates little to no damage in the producing formation. It should be understood that it is optional to pump acid and/or solvent to quickly clean up the TELEPERF™ degradable barrier material that was filled inside of man-made porous media such as metal bead bed in telescoping tube.

The methods and compositions herein have been proven to a pressure differential (the difference in pressure between inside of TELEPERF™ and in annulus) of about 500 psi (3.4 MPa), and are expected to be successful to pressure differential as high as 3000 psi (20.1 MPa). It will also be appreciated that the methods and compositions described herein are useful to expand an injection well also to inject water or other fluids into a subterranean formation to drive hydrocarbons to a producing well elsewhere, or for other purposes.

The procedural steps and fluids used in the methods herein to protect the reservoir during drill-in may include:

1. Use DIAMOND VES fluid technology (in a non-limiting example) as the drill-in fluid which contains at least one internal breaker, at least one VES stabilizer, at least one viscosity enhancer, and at least one fluid loss control agent. The drill-in fluid will build a pseudo-filter-cake on formation rock face to block drill-in fluid flow into the reservoir formation.
2. Use acid- and/or solvent-soluble plugging material to fill and/or coat the man-made porous media such as metal bead bed within TELEPERF™ structures (flow conduits) during manufacturing.
3. Pull the drilling pipe and bit out of the hole and locate the TELEPERF™ tubular assembly downhole.
4. Pump an acid and/or solvent fluid inside of the TELEPERF tubular to drive drill-in fluid out of the whole tubular and close bottom valve. Then allow the acid and/or solvent fluid to remove and clean up the plugging material inside of metal bead bed of telescoping tubes (i.e. clean-up the TELEPERF™ devices using an acid and/or solvent fluid).
5. Use the DIAMOND VES fluid in step 1 as an extension fluid to extend or telescope out the TELEPERF™ devices through building a highly efficient pseudo-filter cake within and on the metal bead bed of telescoping tubes.
6. Use hydraulic pressure to fully extend the TELEPERF™ devices, and reach the hydraulic pressure that assures each TELEPERF™ device is extended.
7. Allow broken VES fluids and other agents to be flowed back to surface with producing fluids.

The invention will now be described more specifically with respect to the Figures, where in FIG. 1 there is shown the cross-section of a vertically oriented, cylindrical casing or liner 10 having an orifice 12 on either side thereof. The orifice may be created by machining prior to run-in of the casing to the well, or other suitable technique. The casing 10 is placed in a borehole or wellbore 14 having a wall 16 through a subterranean reservoir 20 (also termed a flow source herein, but may also be considered a flow target in the embodiment of a water flood operation or the like). The borehole wall 16 has a pseudo-filter cake 22 thereon as may be deposited by a drilling fluid or, more commonly, a drill-in fluid 24, specifically one described herein that is gelled with a VES. Filter cake deposition is a well known phenomenon in the art, and pseudo-filter cake 22 is expected to be deposited by a similar phenomenon. Pseudo-filter cake 22 (also known as a temporary coating) prevents or inhibits the flow of liquids and must be removed prior to the flow of hydrocarbons from subterranean formation 20, or the injection of water into the formation 20.

Collars, sleeves, barriers, fluid conduits or tubes 18 are provided within the orifices 12. These fluid conduits 18 are shown in FIG. 1 in retracted position within the pipe, liner or casing 10. The flow conduits, sleeves, tubes or plugs 18 contain a man-made porous media such as metal bead bed 36 in which a degradable barrier material 30 filler or coating thereon forms a temporary plug or blockage. For instance, the degradable material 30 resides or is placed in the pores of the bead bed 36 or other porous media 36 which is manufactured inside sleeve 18 as a sand control screen. The pipe 10 and sleeves 18 in the annulus 26 are surrounded by the drill-in fluid 24. Once pipe, liner or casing 10 is placed or positioned in the wellbore 14 as shown in FIG. 1, a fluid is pumped there through to remove the degradable material 30 from the porous media 36 (e.g. bead bed). This fluid (not shown in the Figures) may be an acid, a solvent, or water.

In FIG. 2, drill-in fluid 34 may be pumped through the interior space of casing, pipe or liner 10 and into conduits 18 to form temporary barriers or pseudo-filter cakes 32 within and upon or against man-made porous media such as metal bead bed 36. Pseudo-filter cakes 32 provide sealing of conduits 18 along with man-made porous media 36 (e.g. stainless steel beads). The hydraulic pressure of the fluid 34 causes conduits 18 extending them or telescoping them outward in the direction of the wellbore wall 16, most typically to the position where the conduits 18 touch the wall 16.

The degradable material 30 within man-made porous media of conduits barriers, sleeves or tubes 18 is degraded or disintegrated through a mechanism such as dissolution (solvent), chemical reaction (acid), heat, the passage of a sufficient amount of time, e.g. a few hours, or a combination thereof.

The resulting configuration would appear schematically similarly to FIG. 3 where flow pathways 28 are left between the orifices 12 and the formation 20, but pseudo-filter cake 22 and 32 (temporary coating and temporary barrier, respectively) will collapse (i.e. lose viscosity) after internal or external breaker breaks or disrupts the VES micelle structure (i.e. collapse the viscous elongated micelle structures to more spherical non-viscous micelle structures), and the fluid loss control particles are released during micellular rearrangement and will be dissolved and/or flowed back with producing fluids. Internal breakers are those which would reside within the micellular pseudo-filter cake and external breakers would be those fluids containing VES degrading surfactant and/or solvent and/or acid and the like designed to be placed downhole to breakdown (clean-up) the pseudo-filter cake within conduits 18. After this point, the well would be ready to be produced, for instance, hydrocarbons flowing through pathways 28 from the formation 20 into the casing 10 in the direction of the large arrows, or the well would be ready to have water injected in the direction from the casing 10 through flow pathways 28 into the formation 20 (in a direction opposite from the large arrows).

The concept of a degradable barrier could be advantageously used in other applications besides the completions embodiment discussed most fully herein. For instance, a degradable barrier could serve as a protective coating on delicate or sensitive parts of downhole tools. A coating could be applied on the surface and serve as such until in place in the well. The removal mechanism would then be activated to place the tool into service. For instance, sand control screens and other downhole filtration tools could be coated to prevent plugging while running in the hole, thereby enhancing the gravel placement to prevent voids from forming and dissolving filter cakes on open hole wellbores.

As previously discussed, the removal mechanism could include, but is not necessarily limited to heat, time, the application of a chemical such as acid, solvent, water, and the like. These types of coatings could also be used to control the release of chemicals or activate a downhole switch such as upon the influx of water into the production stream. This technology could be used to place temporary plugs into orifices that stay closed until water (or other agent) dissolves or degrades them. Downhole hydraulic circuits could also be constructed for "intelligent" well completion purposes. In general, these polymers and other temporary, degradable materials could be applied to any situation where isolation from well fluids is desired until a known or predetermined event occurs to remove them.

It will be appreciated that temporary barriers could find utility on or within mechanisms at remote locations other than subterranean reservoirs. Such other remote locations include, but are not necessarily limited to, the interior of remote pipelines, subsea locations, polar regions, spacecraft, satellites, extraterrestrial planets, moons and asteroids, and within biological organisms, such as human beings, and the like.

Viscoelastic surfactant (VES) based fluid systems have been used for fracturing for over a decade. VES fluids are composed of low molecular weight surfactants that form elongated or "rod-like" micelle structures which exhibit viscoelastic behavior to increase fluid viscosity. VES fluids are unlike polymer-based systems in that they are non-wall building and do not form a true filter cake on the formation face. Without filter cake development, the amount of VES fluid that leaks off from the fracture during a fracturing treatment is primarily fluid viscosity dependent. Conventional VES fluids may exhibit relatively high fluid leak-off from the fracture during a treatment and "screening out" is a common problem. Because of very poor fluid efficiency, (1) the permeability of a reservoir may be limited to about 800 md, and in most cases is limited to less than about 400 md, (2) more total fluid volume is required for a given treatment, and (3) larger amounts of "leaked-off fluid" within the reservoir matrix occurs which needs to be removed (cleaned up) after treatment. Additionally, conventional VES fluids have not contained internal breakers. That is, they have depended upon reservoir hydrocarbons to contact, break, and clean up the leaked-off VES fluid. However, there are many cases where reliance on external breaking agents (contacting reservoir hydrocarbons, especially in gas wells) does not result in uniform or complete removal of VES fluids from the treated reservoir after a fracturing treatment and impaired production occurs. In many cases post treatment clean-up fluids that contain VES breaking agents (such as alcohols and mutual solvents) have been required to remove unbroken VES fluid within the hydrocarbon producing formation. Post treatment clean-up fluids seldom, if ever, have uniform coverage to contact and remove all unbroken VES fluid from the reservoir. Recent publications (SPE 102468 and SPE 102469) have shown cases that without internal breakers VES fluids may generate the same formation damage that polymer-gelled fluids do. Depending on the hydrocarbon in the producing reservoir (the porous medium) in every case to contact the VES micelles to break the VES fluid may be questionable.

There are aqueous fluids gelled with viscoelastic surfactants that are known to be "broken" or have their viscosities reduced, although some of the known breaking methods utilize external clean-up fluids as part of the treatment design (such as pre- and post-flush fluids placed within the reservoir before and after well completion treatments, such as conventional gravel packing and also "frac-packing"—hydraulic fracturing followed by gravel packing treatment). There are other known methods, but they are relatively slow—for instance the use of VES-gel breaking bacteria with fluid viscosity break times ranging from a day up to more commonly 21 days. There has evolved in the stimulation fluid art an industry standard need for "quick gel break", but for VES-gelled fluids this has been a substantially challenging problem. There needs to be a method for breaking VES-gelled fluids that can be as easy, as quick, and as economic as breaking conventional polymeric fluids, if possible using an internal breaker. At the same time, it is not desirable to reduce the viscosity of the fluid, i.e. break the gel, immediately or essentially instantaneously. Of considerable concern is the fact than an unbroken VES fluid has exceptionally high viscosity at very low shear rate and static conditions which makes it difficult for reservoir hydrocarbons to contact all of the VES fluid and to displace it from the pores of a treated reservoir. This is particularly true for gas reservoirs and crude oil reservoirs that have heterogeneous permeability with high relative permeability sections present.

New methods and compositions for fracturing hydrocarbon producing reservoirs have been discovered that will overcome many of the disadvantages of while significantly improving the benefits of using VES fluids. The compositions of the fracturing fluids herein is a synergistic combination of internal breakers with one or more high temperature stabilizers, viscosity enhancers, fluid loss control agents, and mix water brines up to 14.4 ppg salinity (1.7 kg/liter), e.g. $CaBr_2$ in one non-limiting embodiment. The internal breakers described herein surprisingly work in the presence of several types of VES micelle stabilizers, micelle viscosity enhancers, micelle fluid loss control agents, a wide range of mix water salinity (including divalent ions like calcium and magnesium) for fluid temperature applications ranging from about 80° F. to about 300° F. (about 27 to about 149° C.). The ability of these agents to work together by compatible mechanisms is remarkably unique and allows the many enhanced VES fluid performance properties to be combined.

Figure 6:
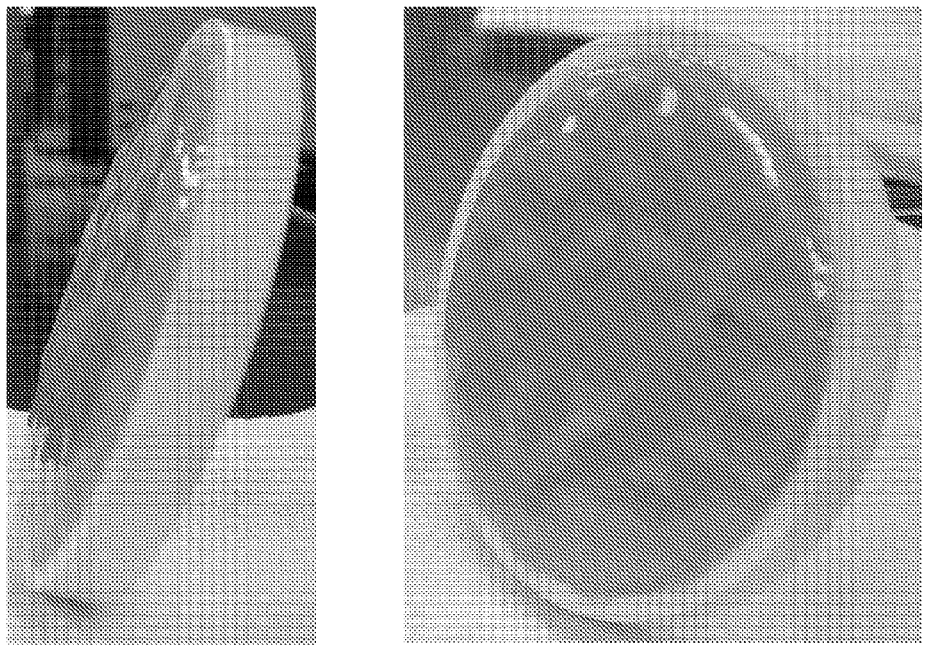
FIG. 6 are two photographs of the same 400 md ceramic disk used in FIG. 4 showing the VES pseudo-filter cake thereon.

Suitable fluid loss control agents herein are those that produce the novel "pseudo-filter cake", that is, a highly viscous layer of VES fluid composed of unique particles associating with VES micelles on the core and formation faces (FIG. 6). The ability to generate pseudo-filter cake will significantly reduce the rate of VES fluid leak-off, similar to the polymeric-type filter cakes but through the use of completely different mechanisms than conventional polymer filter cakes. The pseudo-filter cake has leak-off control performance similar to or analogous to polymeric-type filter cake, yet the clean-up of the pseudo-filter cake is far superior to that of conventional polymeric filter cake. In polymer filter cake, most of breaker in the polymer fluid system is leaked-off into the formation matrix and leaves a high concentration of polymer in the cake (fracture). The breaker is not attached to or connected with the polymer. In VES pseudo-filter cake, the internal breaker appears to be contained within or resident inside of VES micelles and thus goes wherever VES micelles go, in one non-limiting explanation. The fluid loss control agents may work from about 80° F. to about 300° F. (about 27 to about 149° C.). A wide range of particle types and properties have been found of utility to improve the performance of the VES fluid, which includes, but is not necessarily limited to, surface adsorption, crystal surface charges, piezoelectric and pyroelectric particles, and nano-sized particle properties and technology. Additionally, the synergistic use of internal breakers with the pseudo-filter cake has been discovered to allow the pseudo-filter cake to be readily degraded into an easily producible broken VES fluid. Another improved performance feature is how the fluids herein, a portion of which may inevitably leak-off into the pores of the reservoir during a treatment, can carry with it internal breaker that converts the VES fluid into an easily producible fluid without the need for contacting reservoir hydrocarbons. This is a significant improvement over conventional methods and compositions, which, without contacting hydrocarbons, exhibit very high viscosity at very low shear rates, such as 2000 cps or more at 1 $sec^{-1}$ shear rate. The very high viscosity of VES fluids at very low shear rates makes the leaked-off VES fluid within the pores of the formation require higher reservoir pressure in order to move and remove (clean up) the fluid within the reservoir matrix. Laboratory core clean-up tests have shown that very little pressure and time is required to remove internally broken VES from the pore matrix of Berea cores as compared to VES-gelled fluids without an internal breaker.

VES gelled aqueous fluids may exhibit very high viscosity at very low shear rates and under static conditions. The exceptionally high viscosity at low shear rates, often in thousands of centipoise, can make the VES gelled fluid very difficult to move and displace from the pores and natural fractures of the formation. Thus, it is important that the viscosity of any VES-based fluid be reduced or broken in some manner so that it may be easily and quickly flowed back from the formation.

Figure 4:
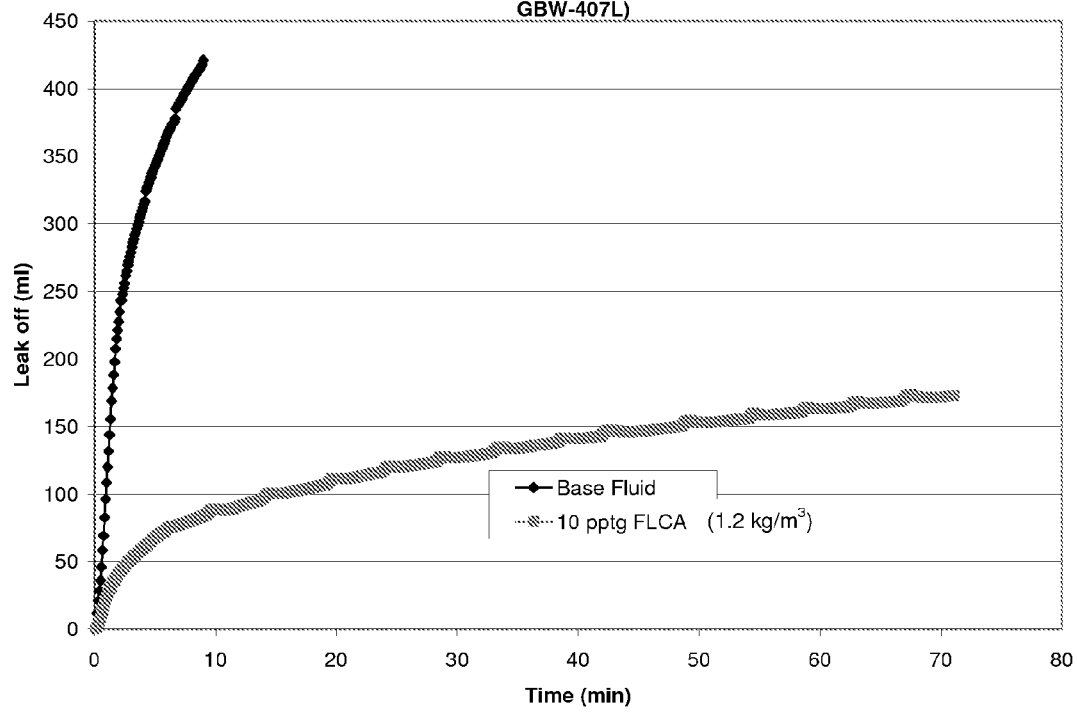
FIG. 4 is a graph of fluid leakoff over time through a 400 md ceramic disk at 250° F. (121° C.) and 300 psi (2.1 MPa)
Figure 5:
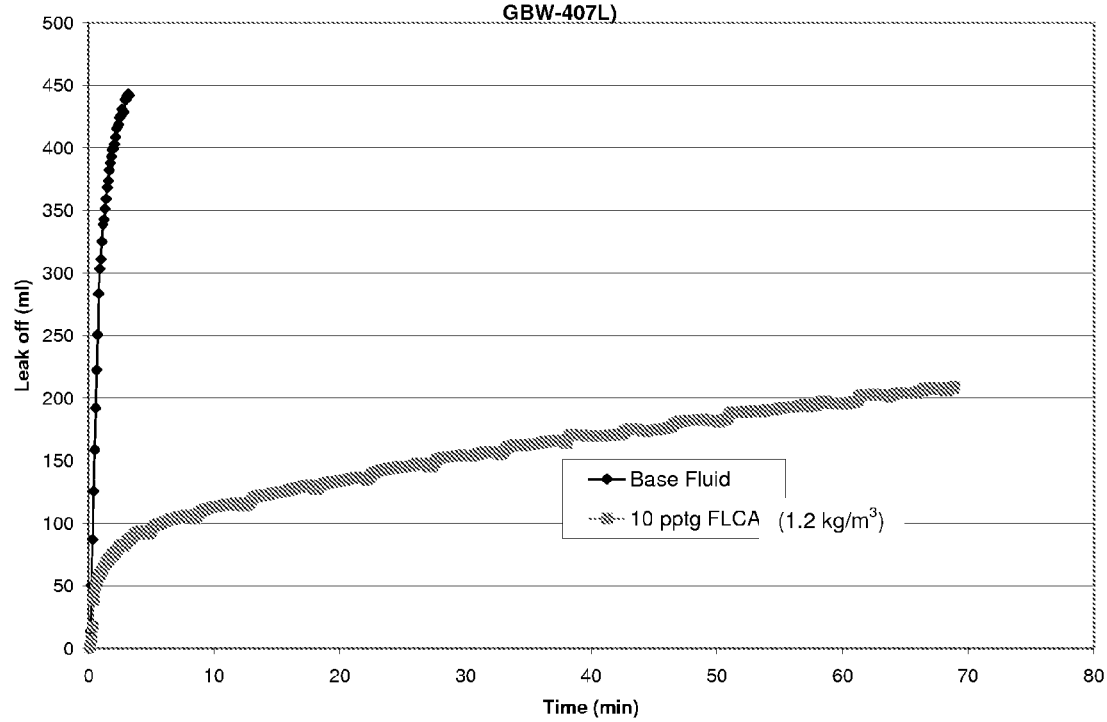
FIG. 5 is a graph of fluid leakoff over time through a 2000 md ceramic disk at 250° F. (121° C.) and 300 psi (2.1 MPa), where the fluid used is the same as in FIG. 4.

In these VES-gelled fluids, a viscous gel starts to develop when the viscoelastic surfactant (VES) is mixed with an aqueous base fluid. A salt or other counterion may be used in the aqueous fluid containing VES to help promote viscous micelle formation. The VES-based fracturing fluid is pumped in one or more sequential stages. The stages of viscoelastic surfactant gelled fluid (that contains the mineral oil and/or fish oil, transition metal ion source, saponified fatty acid, unsaturated or saturated fatty acid or other internal breaker, e.g.) maintains a high viscosity prior to treatment and eventual breaking (viscosity reduction) of the fluid through action of the breaker. The viscosity of the VES gelled fluid is particularly improved, increased or enhanced, especially at low shear rates, by the presence of particulate viscosity enhancers. The rate of fluid leak-off during a fracturing treatment is also significantly reduced by the presence of particulate fluid loss control agents. Further, the viscosity stability of the VES-gelled fluid may be improved or enhanced by the presence of particulate high temperature viscosity stabilizing agents. The viscosity enhancers, viscosity stabilizers, and fluid loss control agents, further improve the ability of the VES-based aqueous fluid to form pseudo-filter cake, and each work by a mechanism that does not inhibit the activity or mechanism of the other. In one non-limiting example, the presence of a high temperature viscosity stabilizer does not inhibit the activity of the internal breakers, as seen in FIGS. 4 and 5. In another non-limiting example, the presence and activity of a fluid loss control agent does not inhibit the breaking activity of an internal breaker. After a period of time, the internal breaker (e.g. mineral oil and/or fish oil) breaks the viscous gel, i.e. lowers the viscosity of the drill-in fluid readily and easily in the presence of the viscosity stabilizers, viscosity enhancers, and the like. The internally broken VES fluid is very easy to flow back with the producing fluid, leaving little or no damage to the formation. Very little reservoir pressure and time is required to produce and clean up the broken VES fluid. No reliance on reservoir hydrocarbons is required to contact and clean up the VES fluid. Because of their nanometer size and the minute amount used, the particulate viscosity enhancers and stabilizers are also easily producible and will readily clean-up and flow back with the broken VES fluid, leaving little to no particulate damage to the formation.

Although in one non-limiting embodiment, certain materials or components used for fluid loss control agents may also function as viscosity stabilizers and/or viscosity enhancers, in another non-restrictive embodiment, it will be appreciated that the fluid loss control agents used are different from the viscosity stabilizers used, and in turn the viscosity enhancers employed are different from either the fluid loss control agents and viscosity stabilizers employed.

The improved breaking methods herein allow relatively quick breaks, such as within 1 to about 144 hours, compared to using bacteria to break VES which takes at least 48 or more hours, and more typically 47 to 21 days or more. In another non-limiting embodiment the break occurs within about 1 to about 96 hours; alternatively from about 1 to about 48 hours, and in another non-restrictive version about 1 to about 24 hours, depending if the DIAMOND VES fluid is to be used as the drill-in fluid during reservoir drilling or as the extension fluid to extend conduits 18. Internal breakers suitable for the methods and compositions herein include transition metal ion sources, reducing agent sources, chelating agent sources, alkali metal sources, alkaline earth metal sources, saponified fatty acids, mineral oils, hydrogenated polyalphaolefin oils, saturated fatty acids, unsaturated fatty acids and combinations thereof. Bacteria may also be used alone or conjunction with these other internal breakers, although as noted, reducing the viscosity of VES gelled fluids with bacteria is relatively slow. The use of bacteria as a viscosity breaker for VES gelled fluids is described in U.S. Pat. No. 7,052,901 to Baker Hughes, incorporated herein in its entirety by reference.

The internal breakers (e.g. mineral oils, hydrogenated polyalphaolefin oils, saturated fatty acids, polyunsaturated fatty acids, and the like) are not solubilized in the brine, since they are inherently hydrophobic, but rather interact with the VES surfactant worm-like micelle structures initially as dispersed microscopic oil droplets and thus form an oil-in-water type emulsion where the oil droplets are dispersed in the "internal phase" as a "discontinuous phase" of the brine medium/VES fluid which is the "outer phase" or "continuous phase". Laboratory tests have shown that small amounts of unsaturated fatty acids, enough to eventually completely the break VES viscosity, will not spontaneously degrade VES viscosity upon individual association and dispersion within the VES micelles, but will become active to degrade VES viscosity upon a triggering event, i.e. activation, such as auto-oxidation of the fatty acids to products that disrupt the elongated, "rod-like" or "worm-like" micelles.

Surprisingly and unexpectedly the method may employ one or more mineral oil (as a non-limiting example of a suitable breaker) as the breaking component. This is surprising because, as previously discussed, the literature teaches that contact of a VES-gelled fluid with hydrocarbons, such as those of the formation in a non-limiting example, essentially instantaneously reduces the viscosity of the gel or "breaks" the fluid. By "essentially instantaneously" is meant less than one-half hour. The rate of viscosity break for a given reservoir temperature by the methods described herein is influenced by type and amount of salts within the mix water (i.e. seawater, KCl, NaBr, $CaCl_2$, $CaBr_2$, $NH_4Cl$ and the like), presence of a co-surfactant (i.e. sodium dodecyl sulfate, sodium dodecyl benzene sulfonate, potassium laurate, potassium oleate, sodium lauryl phosphate, and the like), VES type (i.e. amine oxide, quaternary ammonium salt, and the like), VES loading, the amount of breaker (e.g. mineral oil) used, the distillation range of the mineral oil, its kinematic viscosity, the presence of components such as aromatic hydrocarbons, and the like.

It is important to add the lower molecular weight mineral oils after the VES product is added to the aqueous fluid. However, for higher molecular weight mineral oils, types like Gloria® and Hydrobrite® 200 from Crompton Corporation, they may be added before, during or after the VES product addition. Mineral oil (also known as liquid petrolatum) is a by-product in the distillation of petroleum to produce gasoline. It is a chemically inert transparent colorless oil composed mainly of linear, branched, and cyclic alkanes (paraffins) of various molecular weights, related to white petrolatum. Mineral oil is produced in very large quantities, and is thus relatively inexpensive. Mineral oil products are typically highly refined, through distillation, hydrogenation, hydrotreating, and other refining processes, to have improved properties, and the type and amount of refining varies from product to product. Highly refined mineral oil is commonly used as a lubricant and a laxative, and with added fragrance is marketed as "baby oil" in the U.S. Most mineral oil products are very inert and non-toxic, and are commonly used as baby oils and within face, body and hand lotions in the cosmetics industry. Other names for mineral oil include, but are not necessarily limited to, paraffin oil, paraffinic oil, lubricating oil, base oil, white mineral oil, and white oil.

In one non-limiting embodiment the mineral oil is at least 99 wt % paraffinic. Because of the relatively low content of aromatic compounds, mineral oil has a better environmental profile than other oils. In general, the more refined and less aromatic the mineral oil, the better. In another non-restrictive version, the mineral oil may have a distillation temperature range from about 160 to about 550° C., alternatively have a lower limit of about 200° C. and independently an upper limit of about 480° C.; and a kinematic viscosity at 40° C. from about 1 to about 250 cSt, alternatively a lower limit of about 1.2 independently to an upper limit of about 125 cSt. Specific examples of suitable mineral oils include, but are not necessarily limited to, Benol®, Carnation®, Kaydol®, Semtol®, Hydrobrite® and the like mineral oils available from Crompton Corporation, Escaid®, Exxsol® Isopar® and the like mineral oils available from ExxonMobil Chemical, and similar products from other mineral oil manufacturers. The Escaid 110® and Conoco LVT-200® mineral oils have been well known components of oil-based drilling muds and the oil industry has considerable experience with these products, thus making them an attractive choice. The mineral oils from ConocoPhillips Company with their high purity and high volume use within other industries are also an attractive choice.

It has been discovered in breaking VES-gelled fluids prepared in monovalent brines (such as 3% KCl brine) that at temperatures below about 180° F. (82° C.) Escaid® 110 works well in breaking VES-gelled fluids, and that at or above about 140° F. (60° C.) Hydrobrite® 200 works well. The use of mineral oils herein is safe, simple and economical. In some cases for reservoir temperatures between about 120° to about 240° F. (about 49° to about 116° C.) a select ratio of two or more mineral oil products, such as 50 wt % Escaid® 110 to 50 wt % Hydrobrite® 200 may be used to achieve controlled, fast and complete break of a VES-gelled fluid.

It has also been discovered that the type and amount of salt within the mix water used to prepare the VES fluid (such as 3 wt % KCl, 21 wt % $CaCl_2$, use of natural seawater, and so on) and/or the presence of a VES gel stabilizer (such as VES-STA 1 available from Baker Oil Tools) may affect the activity of a mineral oil in breaking a VES fluid at a given temperature. For example, Escaid® 110 at 5.0 gptg will readily break the 3 wt % KCL based VES fluid at 100° F. (38° C.) over a 5 hour period. Escaid® 110 also has utility as a breaker for a 10.0 ppg $CaCl_2$ (21 wt % $CaCl_2$) based VES fluid at 250° F. (121° C.) when a VES stabilizer (2.0 pptg VES-STA 1) is included. More information about using mineral oils, hydrogenated polyalphaolefin oils and saturated fatty acids as internal breakers may be found in U.S. patent application Ser. No. 11/517,688 filed Sep. 8, 2006, incorporated by reference herein in its entirety.

In one non-limiting embodiment these gel-breaking products or breakers work by rearrangement of the VES micelles from rod-shaped or worm-shaped elongated structures to spherical structures. The breaking components described herein may also include the unsaturated fatty acid or polyenoic and monoenoic components of U.S. Patent Application Publication 2006/0211776, Ser. No. 11/373,044 filed Mar. 10, 2006, incorporated herein in its entirety by reference. In one non-limiting embodiment these unsaturated fatty acids (e.g. oleic, linoleic, linolenic, eicosapentaenoic, etc.) may possibly be used alone—in oils they are commonly found in (flax oil, soybean oil, etc), and can be provided as custom fatty acid blends (such as Fish Oil 18:12 TG by Bioriginal Food & Science Corp.)—or used together with the mineral oils herein. In another non-limiting embodiment, natural saturated hydrocarbons such as terpenes (e.g. pinene, d-limonene, etc.), saturated fatty acids (e.g. lauric acid, palmitic acid, stearic acid, etc. from plant, fish and/or animal origins) and the like may possibly be used together with or alternatively to the mineral oils herein. In some cases it is preferred that the plant or fish oil be high in polyunsaturated fatty acids, such as flax oil, salmon oil, and the like. The plant and fish oils may be refined, blended and the like to have the desired polyunsaturated fatty acid composition modified for the compositions and methods herein. Other refinery distillates may potentially be used in addition to or alternatively to the mineral oils described herein, as may be hydrocarbon condensation products. Additionally, synthetic mineral oils, such as hydrogenated polyalphaolefins, and other synthetically derived saturated hydrocarbons may be of utility to practice the methods herein.

In one non-limiting embodiment, the breaking or viscosity reduction is triggered or initiated by heat. These mineral, plant, and animal oils will slowly, upon heating, break or reduce the viscosity of the VES gel with the addition of or in the absence of any other viscosity reducing agent. The amount of internal breaker (mineral oil, e.g.), needed to break a VES-gelled fluid may in some cases be temperature dependent, with less needed as the fluid temperature increases. For mineral oil, the kinematic viscosity, molecular weight distribution, and amount of impurities (such as aromatics, olefins, and the like) also appear to influence the rate in which a mineral oil will break a VES-gelled fluid at a given temperature. For unsaturated fatty acid oils the type and amount of unsaturation (i.e. double carbon bonds) appears to be the major influence on the rate at which the fatty acid oil will break the VES-gelled fluid at a given temperature. Once a fluid is completely broken at an elevated temperature and cooled to room temperature a degree of viscosity reheal may occur but in most cases no rehealing is expected. The effective amount of mineral oil, plant oil and/or fish oil ranges from about 0.1 to about 20 gptg based on the total fluid, in another non -limiting embodiment from a lower limit of about 0.5 gptg, where "total fluid" means overall VES gelled fluid with all components of the particular embodiment. Independently the upper limit of the range may be about 12 gptg based on the total fluid. (It will be appreciated that units of gallon per thousand gallons (gptg) are readily converted to Si units of the same value as, e.g. liters per thousand liters, $m^3/1000\,m^3$, etc.)

Controlled viscosity reduction rates may be achieved at a temperature of from about 70° F. to about 400° F. (about 21 to about 204° C.), and alternatively at a temperature of from about 100° F. independently up to an upper end of the range of about 280° F. (about 38 to about 138° C.), and in another non-limiting embodiment independently up to about 300° F. (149° C.). In one non-limiting embodiment, the fluid designer would craft the fluid system in such a way that the VES gel would break at or near the formation temperature after the flow conduits are properly set.

In one non-limiting embodiment, fluid internal breaker design would be based primarily on downhole temperature, i.e. the temperature the fluid will be heated to naturally during reservoir drilling or once the flow conduits (e.g. TELEPERF™ structures) are placed. Fluid design may take into account the expected duration or exposure of the fluid at formation temperature. There would generally be no additional temperature or heating the VES fluid would see or experience other than original reservoir temperature.

In another non-limiting example, a combination of internal breakers may have synergistic results, that is, the breaking profile of the fluid over time may be improved when two types of internal breakers are used rather only one or the other. By using combinations of internal breakers, both the initial and final break of the VES fluid may be customized, that is, have improved overall breaking performance. Surprisingly, even with two internal breaker mechanisms present in the VES fluid, the novel pseudo-filter cake with fluid loss control agent still shows excellent fluid loss control.

It is sometimes difficult to specify with accuracy in advance the amount of the various breaking components that should be added to a particular aqueous fluid gelled with viscoelastic surfactants to sufficiently or fully break the gel, in general. For instance, a number of factors affect this proportion, including but not necessarily limited to, the drill-in time; the locating casing downhole time; the particular VES used to gel the fluid; the particular breaker used (e.g. mineral, plant, and/or fish oil, unsaturated fatty acid, etc.); the temperature of the fluid; the downhole pressure of the fluid, the starting pH of the fluid; and the complex interaction of these various factors. Nevertheless, in order to give an approximate idea of the proportions of the various breaking components to be used in the methods herein, approximate ranges will be provided. In an alternative, non-limiting embodiment the amount of mineral oil that may be effective in the methods herein may range from about 5 to about 25,000 ppm, based on the total amount of the fluid. In another non-restrictive version of the invention, the amount of mineral oil may range from a lower end of about 50 independently to an upper end of about 12,000 ppm.

The use of transition metal ion sources as breakers for VES-gelled fluids is more fully described in U.S. Ser. No. 11/145,630 filed Jun. 6, 2005, published as U.S. Patent Application Publication 2006/0041028, incorporated by reference herein in its entirety. Briefly, the transition metal ion source used as an internal breaker may include a transition metal salt or transition metal complex, where the transition metal may be from Groups VA, VIA, VIIA, VIIIA, IB, IIB, IIIB, and IVB of the Periodic Table (previous IUPAC American Group notation). One or more chelating agents and/or one or more reducing agent sources may also be used in conjunction with the transition metal ion sources as breaking agents. In one non-limiting embodiment, the amount of transition metal ion from the transition metal ion source ranges from about 0.01 to about 300 ppm, based on the total fluid.

The use of saponified fatty acids as breakers for VES gelled aqueous fluids is more fully described in U.S. Ser. No. 11/372,624 filed Mar. 10, 2006, published as U.S. Patent Application Publication 2006/0211775, incorporated by reference herein in its entirety. Briefly, the saponified fatty acids are soap reaction products of a fatty acid with an alkaline compound selected from the group consisting of organic bases, alkali metal bases, alkali earth metal bases, ammonium bases, and combinations thereof. The soap reaction products may be pre-formed prior to addition as an internal breaker, or may be formed in situ. Suitable fatty acids include, but are not limited to those found in plant oils and animal oils. Suitable alkali metal bases, alkali earth metal bases and ammonium bases include, but are not necessarily limited to oxides and hydroxides of cations of the group including Na, K, Cs, Ca, Mg, Ba, Fe, Mn, Cu, Zn, Zr, Mo, V, Co, Al, Sn, $NH_4$, $(CH_3)_4$N, and mixtures thereof. Suitable organic bases include, but are not necessarily limited to, diethanolamine, triethanolamine, choline bases and mixtures thereof. In one non-restrictive embodiment herein, the amount of saponified fatty acid that is effective as a viscosity breaker ranges from about 50 to about 20,000 ppm based on the total viscoelastic surfactant gelled fluid.

The use of the disclosed breaker systems is ideal for controlling viscosity reduction of VES based drill-in fluids along with VES-based extension fluids for TELEPERF™. The breaking system may also be used for breaking fracturing fluids, gravel pack fluids, acidizing or near-wellbore clean-up fluids, and loss circulation pill fluids composed of VES. The VES breaking methods herein are a significant improvement in that they give breaking rates for VES based fluids that the industry is accustomed to with conventional polymer based fluids, such as borate crosslinked guar and linear HEC (hydroxyethylcellulose). Potentially more importantly, the use of these internal breaker systems in combination with external downhole breaking conditions should help assure and improve hydrocarbon production compared to prior art that uses only external mechanisms to break the VES fluid for effective and complete VES fluid clean-up after completion or a treatment.

In one non-limiting embodiment of the invention, the compositions herein will degrade the gel created by a VES in an aqueous fluid, by disaggregation or rearrangement of the VES micellar structure. However, the inventors do necessarily not want to be limited to any particular mechanism. Also, in another non-restrictive version, the only component present in the VES gelled aqueous fluid that reduces viscosity is one of the internal breakers described herein, or mixtures thereof. That is, a separately introduced external breaker component introduced after the VES-gelled drill-in fluid is not used (e.g. various clean-up fluids). However, conditions (such as elevated temperature) and already existing chemicals (reservoir hydrocarbons) may be present when and where the internal breakers are included, either intentionally or incidentally.

The viscoelastic surfactant gelled fluids herein may contain at least one viscosity enhancer. The viscosity enhancers herein also aid with fluid loss control. Suitable viscosity enhancers include, but are not limited to, pyroelectric particles, piezoelectric particles, and mixtures thereof. Details about the use of pyroelectric and piezoelectric particles may be found in U.S. patent application Ser. No. 11/608,035, incorporated by reference herein in its entirety. In one non-limiting theory or explanation, when the fluid containing the viscosity enhancers is heated and/or placed under pressure, the particles develop surface charges that associate, link, connect, or relate the VES micelles to one another thereby increasing the viscosity of the fluid. This is somewhat analogous to the way crosslinkers connect various polymer chains, but the way the viscosity enhancers associate the elongated or "worm-like" VES micelles is believed to be completely different.

Suitable viscosity enhancers include, but are not necessarily limited to, ZnO, berlinite ($AlPO_4$), lithium tantalate ($LiTaO_3$), gallium orthophosphate ($GaPO_4$), $BaTiO_3$, $SrTiO_3$, $PbZrTiO_3$, $KNbO_3$, $LiNbO_3$, $LiTaO_3$, $BiFeO_3$, sodium tungstate, $Ba_2NaNb_5O_5$, $Pb_2KNb_5O_{15}$, potassium sodium tartrate, tourmaline, topaz and mixtures thereof. An effective amount of the viscosity enhancer ranges from about 0.1 to about 500 pptg (about 0.012 to about 60 kg/m$^3$) based on the total aqueous viscoelastic treating fluid.

Additionally, the viscoelastic surfactant fluids herein may also contain high temperature viscosity stabilizers. The viscosity stabilizers used herein would be in most cases for stabilizing or sustaining the VES fluid viscosity at elevated fluid temperatures, such as above 180° F. (82° C.), as contrasted with increasing the fluid viscosity like viscosity enhancers may do. Suitable viscosity stabilizers include, but are not limited to, magnesium oxide, magnesium hydroxide, calcium oxide, calcium hydroxide, sodium hydroxide, and the like. The select viscosity stabilizers may, in one non-limiting embodiment, have an average particle size of 500 nanometers or less, that is, to be preferably small enough to be non-pore plugging and thereby will remain with the VES drill-in fluid wherever it goes during the treatment and during flowback. More information about using these oxides and hydroxides as high temperature viscosity stabilizers may be found in U.S. patent application Ser. No. 11/125,465 filed May 10, 2005 and U.S. Provisional Patent Application No. 60/845,916 filed Sep. 20, 2006, both of which are incorporated by reference herein in their entirety.

The increased viscosity of aqueous fluids gelled with viscoelastic surfactants (VESs) may also be maintained or stabilized by one or more stabilizers that are glycols and/or polyols. These glycols and polyols may stabilize the increased viscosity of VES-gelled fluids effectively over an increased temperature range, such as from about ambient to about 300° F. (about 149° C.). Even though some VESs used to increase the viscosity of aqueous fluids contain a glycol solvent, the use, addition or introduction of the same or different glycol or a polyol, possibly of increased purity, may improve the viscosity stability of the fluid as a whole. Suitable glycols for use with the stabilizing method herein include, but are not necessarily limited to, monoethylene glycol (MEG), diethylene glycol (DEG), triethylene glycol (TEG), tetraethylene glycol (TetraEG), monopropylene glycol (MPG), dipropylene glycol (DPG), and tripropylene glycol (TPG), and where the polyols include, but are not necessarily limited to, polyethylene glycol (PEG), polypropylene glycol (PPG), and glycerol and other sugar alcohols, and mixtures thereof. In the case where the stabilizer is a polyol, the molecular weight of the polyol may range from about 54 to about 370 weight average molecular weight, alternatively where the lower threshold is about 92 weight average molecular weight, and/or where the upper threshold is independently about 235 weight average molecular weight. Suitable proportions of glycols or polyol stabilizers that may be used, introduced or added, in one non-limiting embodiment range from about 0.1 to 10.0% by volume based on the total of the aqueous fluid. In an alternate, non-restrictive embodiment, the lower end of this proportion range may be about 0.2% bv, and additionally or alternatively the upper end of this proportion range may be about 5.0% bv. Further details about polyol and/or glycol stabilizers may be found in U.S. Provisional Patent Application No. 60/791,025 filed Apr. 11, 2006, incorporated herein in its entirety by reference.

The viscoelastic surfactant gelled fluids herein may also contain fluid loss control agents, although as noted above, some of the components such as the viscosity enhancers already discussed function as fluid loss control agents at higher concentrations, such as 15 pptg (1.5 kg/m$^3$). Suitable fluid loss agents would include, but not necessarily be limited to alkali earth metal oxides, alkali earth metal hydroxides, transition metal oxides, transition metal hydroxides, and mixtures thereof, such as MgO, ZnO and the like. More information on these fluid loss control agents may be found in U.S. Provisional Patent Application No. 60/815,693 incorporated by reference herein in its entirety. Improving or increasing fluid loss may also be accomplished by increasing the concentration or use of the nano-sized particles that enhance viscosity. Increasing the concentration of these particles will eventually be enough to allow the build up of higher fluid viscosity for: 1) reservoir matrix viscosity improvement; and for 2) development of mostly an "external viscous VES fluid layer" on the formation, that is, a pseudo-filter cake (in contrast to a true filter cake that often extends into the formation with potential for damaging the formation). The combination of both can occur, that is, an internal/matrix of the pore-type viscosity fluid loss control and external pseudo-filter cake development. In one non-limiting embodiment, the amount of fluid loss control agent ranges from about 2 to about 200 pptg (about 0.2 to about 24 kg/m$^3$) based on the VES gelled fluid. It may be realized that certain materials, e.g. alkali metals and alkaline earth metals, may serve and function as both "high temperature viscosity stabilizers" and as fluid loss agents within the fluids herein.

It is expected in one non-limiting embodiment that the fluid loss control agents would be fine particles including the nano-sized particles discussed above for fluid loss control and viscosity enhancing. Increasing the amount of these agents increases the building of pseudo-filter cake. These particles include, but are not necessarily limited to the piezo- and pyroelectric particles, optionally in nano-sized form. Coarser or larger-sized transition metal oxide and/or transition metal hydroxides such as MgO may also be used alone or together with the nano-sized particles discussed immediately above. The fluid loss control agents may be added at any time during the mixing and/or blending process.

Any suitable mixing apparatus may be used to formulate the viscoelastic surfactant gelled fluid. In the case of batch mixing, the VES gelling agent, the viscosity enhancer and the aqueous fluid are blended for a period of time. There are select internal breakers (e.g. transitional metal ion source, vegetable, and/or animal oil, etc.) that may be added during batch mixing or on the fly during the treatment. Alternately, other internal breakers are added after batch mixing or on the fly during the treatment (e.g. mineral oil, hydrogenated polyalphaolefin oils, etc.). The VES that is useful herein may be any of the VES systems that are familiar to those in the well service industry, and may include, but are not limited to, amines, amine salts, quaternary ammonium salts, amidoamine oxides, amine oxides, mixtures thereof and the like. Suitable amines, amine salts, quaternary ammonium salts, amidoamine oxides, and other surfactants are described in U.S. Pat. Nos. 5,964,295; 5,979,555; and 6,239,183, incorporated herein by reference in their entirety.

Viscoelastic surfactants improve the treating fluid performance through the use of a polymer-free system. These systems, compared to polymeric based fluids, can offer improved viscosity breaking, higher sand transport capability (where appropriate), are in many cases more easily recovered after treatment than polymers (particularly with the internal breakers discussed), and are relatively non-damaging to the reservoir with appropriate contact with internal breakers and/or sufficient quantity of reservoir hydrocarbons, such as crude oil and condensate. The VES systems are also more easily mixed in field operations.

The viscoelastic surfactants suitable for use herein include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or dipropionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2 \, O^-$ may have the following structure (I):

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amidoamine oxide gelling agent is Akzo Nobel's Aromox® APA-T formulation, which should be understood as a dipropylamine oxide since both R' groups are propyl.

Materials sold under U.S. Pat. No. 5,964,295 include ClearFRAC™, which may also comprise greater than 10% of a glycol. One preferred VES is an amine oxide. As noted, a particularly preferred amine oxide is APA-T, sold by Baker Oil Tools as SurFRAQ™ VES. SurFRAQ is a VES liquid product that is 50% APA-T and greater than 40% propylene glycol. These viscoelastic surfactants are capable of gelling aqueous solutions to form a gelled base fluid. The additives of this invention are used to prepare a VES system sold by Baker Oil Tools as DiamondFRAQ™. Diamond FRAQ™ with its assured breaking technology overcomes reliance on external reservoir conditions in order to break, as compared with products such as ClearFRAC™.

The methods and compositions herein also cover commonly known materials as Aromox® APA-T manufactured by Akzo Nobel and other known viscoelastic surfactant gelling agents common to stimulation treatment of subterranean formations.

The amount of VES included in the drill-in fluid depends on at least two factors. One involves generating enough viscosity to control the rate of fluid leak off into the pores of the reservoir or fracture, and the second involves creating suitable pseudo-filter cake, in the non-limiting case of a drill-in fluid. Thus, depending on the application, the VES is added to the aqueous fluid in concentrations ranging from about 0.5 to 25% by volume, alternatively up to about 12 vol % of the total aqueous fluid (from about 5 to 120 gptg). In another non-limiting embodiment, the range for the present formulations is from about 1.0 independently to about 6.0% by volume VES product. In an alternate, non-restrictive form of the method, the amount of VES ranges from a lower limit of about 2 independently to an upper limit of about 10 volume %.

It is expected that the breaking compositions herein may be used to reduce the viscosity of a VES-gelled aqueous fluid regardless of how the VES-gelled fluid is ultimately utilized. For instance, the viscosity breaking compositions could be used in all VES applications including, but not limited to, VES-gelled friction reducers, VES viscosifiers for loss circulation pills, fracturing fluids (including foamed fracturing fluids and acid fracturing fluids), gravel pack fluids, VES viscosifiers used to clean up drilling mud filter cake, remedial clean-up of fluids after a VES treatment (post-VES treatment), and the like.

A value of the compositions and methods herein is that a VES-based drill-in fluid may be designed to have enhanced breaking characteristics. That is, fluid breaking is no longer solely dependant on external reservoir conditions for viscosity break and is controllable: the rate of viscosity reduction, if complete break is achieved or approached, occurs throughout the reservoir interval, and the amount of reservoir pressure required to displace the VES-based fluid is significantly reduced. Importantly, better clean-up of the VES fluid from the formation and wellbore (i.e. fluid that has been leaked-off into the reservoir and the pseudo-filter cake that develops within the wellbore) can be achieved thereby. Better clean-up of the VES directly influences the well's hydrocarbon productivity. VES fluid clean-up limitations of the past can now be overcome or improved by the use of fluid compositions disclosed herein.

In order to practice the method of the invention, an aqueous treating fluid, as a non-limiting example, is first prepared by blending a viscosity enhancer, a VES gelling agent, and an internal breaker into an aqueous fluid. The aqueous fluid could be, for example, water, brine, seawater, or mixtures thereof. Any suitable mixing apparatus may be used for this procedure. In one non-limiting embodiment, in the case of batch mixing, the viscosity enhancer, VES gelling agent, and the aqueous fluid are blended for a short period of time sufficient to mix the components together, such as for 15 minutes to 1 hour, and the internal breaker may be added just prior to use. In another non-limiting embodiment all of the viscosity enhancer, VES gelling agent and the internal breaking composition may be added to the aqueous fluid on the fly, during a treatment. The breaking component may be added during the VES addition or more typically after the VES addition to the water or brine using appropriate mixing and metering equipment, or if needed in a separate step after the placement of the flow conduits is complete, or combinations of these procedures.

The base fluid can also contain other conventional additives common to the well service industry such as water wetting surfactants, non-emulsifiers, scale inhibitors, and the like. As noted herein, the base fluid may also contain other non-conventional additives which can contribute to the breaking action of the VES fluid, and which are added for that purpose in one non-restrictive embodiment.

Any or all of the above internal breakers (e.g. mineral, vegetable, and animal oils) may be provided in an extended release form such as encapsulation by polymer or otherwise, pelletization with binder compounds, absorbed or some other method of layering on a microscopic particle or porous substrate, and/or a combination thereof. Specifically, the internal breakers (in non-restrictive embodiments mineral, plant and/or fish oils) may be micro- and/or macro-encapsulated to permit slow or timed release thereof. In non-limiting examples, the coating material may slowly dissolve or be removed by any conventional mechanism, or the coating could have very small holes or perforations therein for the mineral oils or other breaker within to diffuse through slowly. For instance, a mixture of fish gelatin and gum acacia encapsulation coating available from ISP Hallcrest, specifically Captivates® liquid encapsulation technology, can be used to encapsulate the internal breakers herein (e.g. mineral, plant, fish, synthetic and other saturated oils). Also, polymer encapsulation coatings such as used in fertilizer technology available from Scotts Company, specifically POLY-S® product coating technology, or polymer encapsulation coating technology from Fritz Industries could possibly be adapted to the methods of this invention. The mineral oils could also be absorbed onto zeolites, such as Zeolite A, Zeolite 13X, Zeolite DB-2 (available from PQ Corporation, Valley Forge, Pa.) or Zeolites Na-SKS5, Na-SKS6, Na-SKS7, Na-SKS9, Na-SKS10, and Na-SKS13, (available from Hoechst Aktiengesellschaft, now an affiliate of Aventis S.A.), and other porous solid substrates such as MICROSPONGE™ (available from Advanced Polymer Systems, Redwood, Calif.) and cationic exchange materials such as bentonite clay or placed within microscopic particles such as carbon nanotubes or buckminster fullerenes. Further, the mineral oils may be both absorbed into and onto porous or other substrates and then encapsulated or coated, as described above.

In one embodiment herein, the methods and compositions herein are practiced in the absence of gel-forming polymers and/or gels or aqueous fluids having their viscosities enhanced by polymers. However, combination use of the compositions and methods herein with polymers and polymer breakers may also be of utility. For instance, polymers may also be added to the VES fluid herein for fluid loss control purposes. Types of polymers that may serve as fluid loss control agents include, but are not necessarily limited to, various starches, modified starches, polyvinyl acetates, polylacetic acid, guar and other polysaccharides, hydroxyethylcellulose and other derivatized celluloses, gelatins, and the like. For more information about using polymers together with viscoelastic surfactants to reduce friction loss and fluid loss, please see U.S. Provisional Patent Application Nos. 60/833,832 filed Jul. 27, 2006 and 60/848,412 filed Sep. 29, 2006, respectively, both of which are incorporated by reference herein in their entirety.

The present invention will be explained in further detail in the following non-limiting Examples that are only designed to additionally illustrate the invention but not narrow the scope thereof.

EXAMPLES

Shown in FIG. 4 is a graph of fluid leakoff as a function of time through a 400 md ceramic disk at 250° F. (121° C.) and 300 psi (2.1 MPa). The base fluid is 13.0 ppg (1.6 kg/liter) $CaCl_2/CaBr_2$ brine, and includes 4% WG-3L VES and 6 pptg (0.7 kg/m$^3$) VES-STA viscosity stabilizer and 1 gptg GBW -407L fish oil breaker available from Baker Oil Tools. It may be seen that the addition of 10 pptg (1.2 kg/m$^3$) MgO fluid loss control agent (FLCA) greatly reduces the amount of fluid leaked off during the experiment.

FIG. 5 is another graph of fluid leakoff over time, in this case through a 2000 md ceramic disk at 250° F. (121° C.) and 300 psi (2.1 MPa), where the fluid used is the same as in FIG. 3. Again, it may be seen that the addition of 10 pptg (1.2 kg/m$^3$) MgO fluid loss control agent (FLCA) greatly reduces the amount of fluid leaked off during the experiment.

Presented in FIG. 6 are two photographs of the same 400 md ceramic disk used in FIG. 3 showing the VES pseudo-filter cake built thereon. Its uniform structure over the disc should be noted, along with its adherence at a nearly vertical angle.

Figure 7:
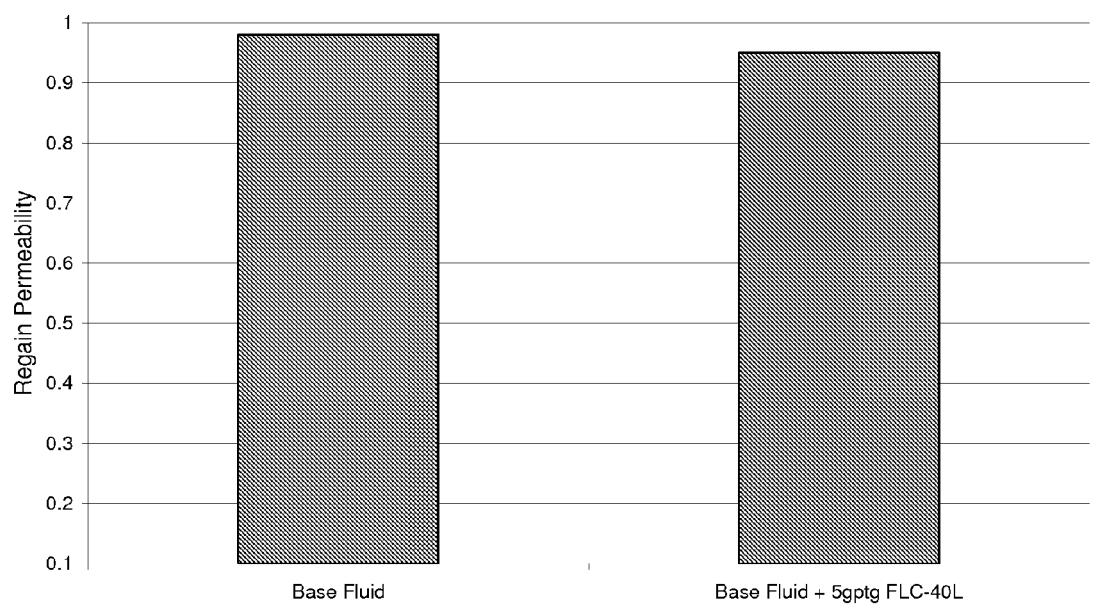
FIG. 7 is a graph of regain permeability test results using 100 md Berea cores at 200° F. (93° C.) where the fluid has no fluid loss control agent and with 5 gptg (0.6 kg/m$^3$) FLC-40L fluid loss control agent (slurried MgO powder mixed in monopropylene glycol)

Shown in FIG. 7 is a graph of regain permeability test results using 100 md Berea cores at 200° F. (93° C.) where the fluid has no fluid loss control agent and then with 5 gptg FLC-40L fluid loss control agent (slurried MgO powder mixed in monopropylene glycol). The base fluid is 10.8 ppg (1.3 kg/liter) $CaCl_2$ brine that contains 4% WG-3L VES and 2 pptg (0.2 kg/m$^3$) VES-STA viscosity stabilizer and 1 gptg GBW-407L. It should be noted that the presence of 5 gptg FLC-40L fluid loss control agent does not significantly affect the regain permeability.

Figure 8:
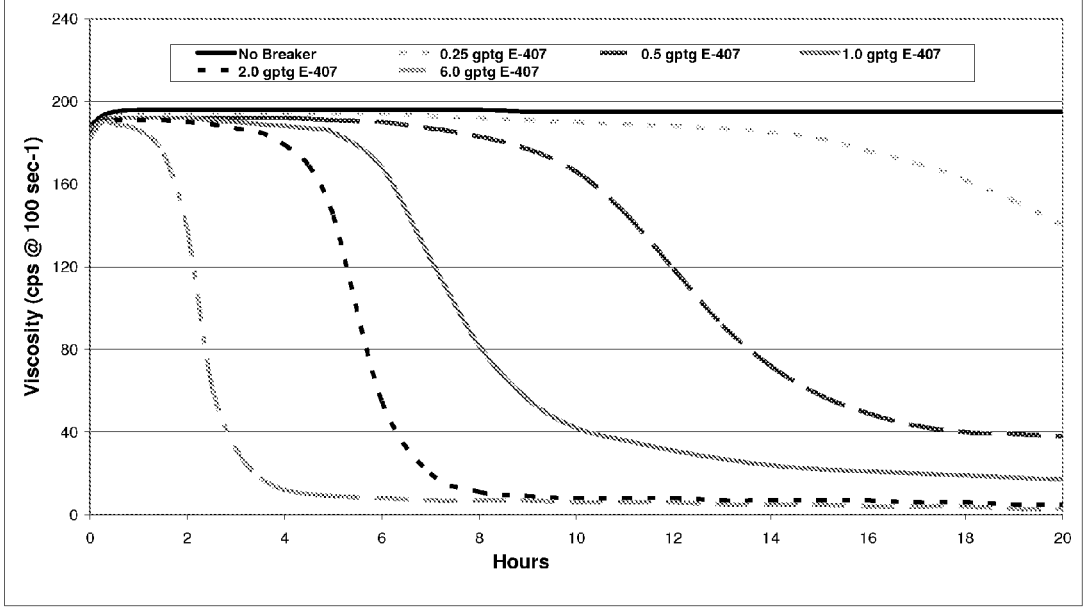
FIG. 8 is a graph of VES break tests showing reducing viscosity as a function of time with no breaker or varying amounts of E407 internal breaker.

Presented in FIG. 8 is a graph of VES break tests showing more rapid reduction in viscosity as a function of time with no breaker or varying amounts of E407 internal breaker (Fish Oil 18:12TG available from Bioriginal Food & Science Corp.). That is, with increasing amounts of internal breaker, the viscosity of the VES-gelled fluid is reduced more rapidly.

Figure 9:
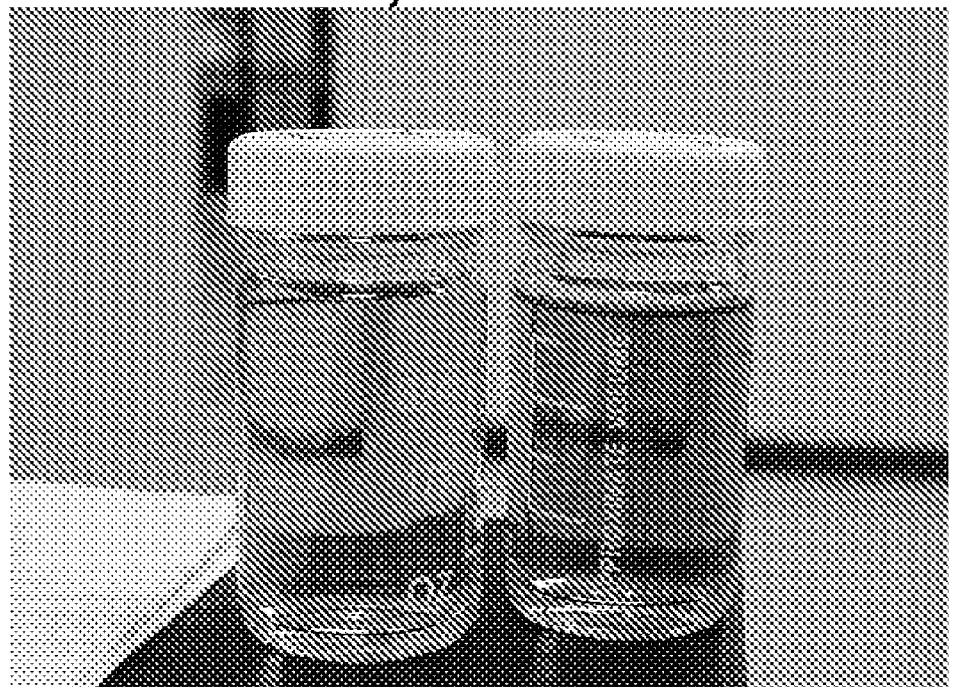
FIG. 9 is a photograph of two bottles of internally broken fluid initially gelled with VES, showing their clarity.

FIG. 9 is a photograph of two bottles of internally broken fluid initially gelled with VES, showing their clarity, which indicates how completely the previously gelled fluids have been broken.

In the foregoing specification, the invention has been described with reference to specific embodiments thereof, and has been demonstrated as expected to be effective in providing a method of facilitating flow of hydrocarbons from or the injection of water (or other liquids) into subterranean formations. However, it will be evident that various modifications and changes may be made to the inventive compositions and methods without departing from the broader spirit or scope of the invention as set forth in the appended claims. Accordingly, the specification is to be regarded in an illustrative rather than a restrictive sense. For example, specific combinations of degradable materials, degradation products, pseudo-filter cake materials, degradation mechanisms and other components falling within the claimed parameters, but not specifically identified or tried in a particular composition or under specific conditions, are anticipated to be within the scope of this invention.

What is claimed is:

1. A method for protecting a subterranean reservoir during drilling comprising:
   drilling a well through a subterranean reservoir using a drill-in fluid and a pipe, where:
      the drill-in fluid comprises:
         water;
         at least one viscoelastic surfactant (VES) in an amount effective to increase the viscosity of the water;
         at least one internal breaker;
         at least one VES stabilizer;
         at least one viscosity enhancer; and
         at least one fluid loss control agent;
      the pipe comprises:
         an interior space;
         an outer surface; and
         at least one flow conduit between the interior space and the outer surface, where the flow conduit bears within it a degradable barrier, and the flow conduit is in a retracted position at least partially within the interior space;
   forming a temporary coating with the drill-in fluid over at least a portion of the wellbore wall;
   positioning the pipe within a wellbore having a wellbore wall at the subterranean reservoir;
   removing the degradable barrier from the flow conduit;
   applying hydraulic pressure of a drill-in fluid within the interior space of the pipe and the flow conduit to form a temporary barrier in the flow conduit, and extending the flow conduit in the direction of the wellbore wall;
   removing the temporary barrier from the flow conduit to at least partially open the flow conduit; and
   removing the temporary coating on the wellbore wall adjacent the flow conduit.

2. The method of claim 1 where the pipe is selected from the group consisting of a conductor pipe, a casing, a tubing, a liner, and combinations thereof.

3. The method of claim 1 where the temporary barrier is a pseudo-filter cake formed by the drill-in fluid.

4. The method of claim 1 where the at least one internal breaker is selected from the group consisting of bacteria, transition metal ion sources, saponified fatty acids, mineral oils, hydrogenated polyalphaolefin oils, saturated fatty acids, unsaturated fatty acids, and combinations thereof.

5. The method of claim 4 where:
when the internal breaker is bacteria, the amount of bacteria ranges from about 0.01 to about 20.0 vol %;
when the internal breaker is a transition metal ion source, the amount of transition metal ion from the transition metal ion source ranges from about 0.01 to about 300 ppm;
when the internal breaker is a saponified fatty acid, the amount of saponified fatty acid ranges from about 50 to about 20,000 ppm; and
when the internal breaker is selected from the group consisting of mineral oils, hydrogenated polyalphaolefin oils, saturated fatty acids, unsaturated fatty acids and combinations thereof, the amount of internal breaker ranges from about 0.1 to about 20 gptg;
all based on the drill-in fluid.

6. The method of claim 1 where the at least one VES stabilizer is selected from the group consisting of alkali metal oxides, alkali metal hydroxides, alkali earth metal oxides, alkali earth metal hydroxides, transition metal oxides, transition metal hydroxides, glycols, polyols, and combinations thereof.

7. The method of claim 1 where the at least one fluid loss control agent is selected from the group consisting of alkali earth metal oxides, alkali earth metal hydroxides, transition metal oxides, transition metal hydroxides, and mixtures thereof.

8. The method of claim 7 where an amount of the fluid loss control agent ranges from about 2 to about 200 pptg (about 0.2 to about 24 kg/m$^3$) based on the VES gelled fluid.

9. The method of claim 1 where the at least one viscosity enhancer is selected from the group consisting of pyroelectric particles, piezoelectric particles, and mixtures thereof.

10. The method of claim 1 where the pipe further comprises a plurality of flow conduits between the interior space and the outer surface bearing a degradable barrier over at least a portion thereof.

11. The method of claim 10 where during extending, at least one of the flow conduits contacts the wellbore wall.

12. The method of claim 1 where the flow conduit further comprises porous media which at least partially bears the degradable barrier.

13. The method of claim 12 where the porous media is selected from the group consisting of a screen, a bead bed and combinations thereof.

14. The method of claim 1 where removing the degradable barrier is accomplished by contacting the degradable barrier with a substance in which the barrier is substantially soluble.

15. The method of claim 1 where the degradable barrier is biodegradable.

16. The method of claim 1 where the degradable barrier is removed upon heating the degradable barrier to a temperature in the range between about 50 and about 200° C.

17. The method of claim 1 where the degradable barrier is substantially removed after the passage of between about 1 and about 240 hours.

18. The method of claim 1 where the degradable barrier is selected from the group consisting of polylactic acid, polycaprolactams, polyglycolic acid, polyvinyl alcohols, polyalkylene oxides, polyalkylene glycols, polyethylene homopolymers, paraffin waxes comprising solid acids, materials comprising solid acid particles, and combinations thereof.

19. The method of claim 1 where the flow source or target is a subterranean formation and the method comprises a hydrocarbon recovery operation.

20. A method for protecting a subterranean reservoir during drilling comprising:
drilling a well through a subterranean reservoir using a drill-in fluid and a pipe, where:
the drill-in fluid comprises:
water;
at least one viscoelastic surfactant (VES) in an amount effective to increase the viscosity of the water;
at least one internal breaker;
at least one VES stabilizer;
at least one viscosity enhancer; and
at least one fluid loss control agent selected from the group consisting of alkali earth metal oxides, alkali earth metal hydroxides, transition metal oxides, transition metal hydroxides, and mixtures thereof;
the pipe selected from the group consisting of a conductor pipe, a casing, a tubing, a liner, and combinations thereof, where the pipe further comprises:
an interior space;
an outer surface; and
at least one flow conduit between the interior space and the outer surface, where the flow conduit bears within it a degradable barrier, and the flow conduit is in a retracted position at least partially within the interior space;
forming a pseudo-filter cake with the drill-in fluid over at least a portion of the wellbore wall;
positioning the pipe within a wellbore having a wellbore wall at the subterranean reservoir;
removing the degradable barrier from the flow conduit;
applying hydraulic pressure of a drill-in fluid within the interior space of the pipe and the flow conduit to form a pseudo-filter cake in the flow conduit, and extending the flow conduit in the direction of the wellbore wall;
removing the pseudo-filter cake from the flow conduit by reducing the viscosity thereof to at least partially open the flow conduit; and
reducing the viscosity of the drill-in fluid thus removing the temporary coating on the wellbore wall adjacent the flow conduit.

21. The method of claim 20 where the at least one internal breaker is selected from the group consisting of bacteria, transition metal ion sources, saponified fatty acids, mineral oils, hydrogenated polyalphaolefin oils, saturated fatty acids, unsaturated fatty acids, and combinations thereof.

22. The method of claim 21 where:
when the internal breaker is bacteria, the amount of bacteria ranges from about 0.01 to about 20.0 vol %;
when the internal breaker is a transition metal ion source, the amount of transition metal ion from the transition metal ion source ranges from about 0.01 to about 300 ppm;
when the internal breaker is a saponified fatty acid, the amount of saponified fatty acid ranges from about 50 to about 20,000 ppm; and when the internal breaker is selected from the group consisting of mineral oils, hydrogenated polyalphaolefin oils, saturated fatty acids, unsaturated fatty acids and combinations thereof, the amount of internal breaker ranges from about 0.1 to about 20 gptg;

all based on the drill-in fluid.

23. The method of claim 20 where the at least one VES stabilizer is selected from the group consisting of alkali metal oxides, alkali metal hydroxides, alkali earth metal oxides, alkali earth metal hydroxides, transition metal oxides, transition metal hydroxides, glycols, polyols, and combinations thereof.

24. The method of claim 20 where the at least one viscosity enhancer is selected from the group consisting of pyroelectric particles, piezoelectric particles, and mixtures thereof.

25. The method of claim 20 where the pipe further comprises a plurality of flow conduits between the interior space and the outer surface bearing a degradable barrier over at least a portion thereof.

26. The method of claim 25 where during extending at least one of the flow conduits contacts the wellbore wall.

27. The method of claim 20 where the flow conduit further comprises a porous media which at least partially bears the degradable barrier.

28. The method of claim 20 where the degradable barrier is selected from the group consisting of polylactic acid, polycaprolactams, polyglycolic acid, polyvinyl alcohols, polyalkylene oxides, polyalkylene glycols, polyethylene homopolymers, paraffin waxes comprising solid acids, materials comprising solid acid particles, and combinations thereof.

29. A method for protecting a subterranean reservoir during drilling comprising:
drilling a well through a subterranean reservoir using a drill-in fluid and a pipe, where:
the drill-in fluid comprises:
water;
at least one viscoelastic surfactant (VES) in an amount effective to increase the viscosity of the water;
at least one internal breaker selected from the group consisting of bacteria, transition metal ion sources, saponified fatty acids, mineral oils, hydrogenated polyalphaolefin oils, saturated fatty acids, unsaturated fatty acids, and combinations thereof;
at least one VES stabilizer;
at least one viscosity enhancer; and
at least one fluid loss control agent selected from the group consisting of alkali earth metal oxides, alkali earth metal hydroxides, transition metal oxides, transition metal hydroxides, and mixtures thereof;
the pipe selected from the group consisting of a conductor pipe, a casing, a tubing, a liner, and combinations thereof, where the pipe further comprises:
an interior space;
an outer surface; and
at least one flow conduit between the interior space and the outer surface, where the flow conduit bears a filter structure at least partially bearing thereon a degradable barrier, and the flow conduit is in a retracted position at least partially within the interior space;
forming a pseudo-filter cake with the drill-in fluid over at least a portion of the wellbore wall;
positioning the pipe within a wellbore having a wellbore wall at the subterranean reservoir;
removing the degradable barrier from the flow conduit;
applying hydraulic pressure of a drill-in fluid within the interior space of the pipe and the flow conduit to form a pseudo-filter cake in the flow conduit, and extending the flow conduit in the direction of the wellbore wall;
removing the pseudo-filter cake from the flow conduit by reducing the viscosity thereof by action of the internal breaker to at least partially opens the flow conduit; and
reducing the viscosity of the drill-in fluid.

30. The method of claim 29 where:
when the internal breaker is bacteria, the amount of bacteria ranges from about 0.01 to about 20.0 vol %;
when the internal breaker is a transition metal ion source, the amount of transition metal ion from the transition metal ion source ranges from about 0.01 to about 300 ppm;
when the internal breaker is a saponified fatty acid, the amount of saponified fatty acid ranges from about 50 to about 20,000 ppm; and
when the internal breaker is selected from the group consisting of mineral oils, hydrogenated polyalphaolefin oils, saturated fatty acids, unsaturated fatty acids and combinations thereof, the amount of internal breaker ranges from about 0.1 to about 20 gptg;

all based on the drill-in fluid.

31. The method of claim 29 where the at least one VES stabilizer is selected from the group consisting of alkali metal oxides, alkali metal hydroxides, alkali earth metal oxides, alkali earth metal hydroxides, transition metal oxides, transition metal hydroxides, glycols, polyols, and combinations thereof.

32. The method of claim 29 where the at least one viscosity enhancer is selected from the group consisting of pyroelectric particles, piezoelectric particles, and mixtures thereof.

33. The method of claim 29 where the pipe further comprises a plurality of flow conduits between the interior space and the outer surface bearing a degradable barrier over at least a portion thereof.

34. The method of claim 33 where during extending at least one of the flow conduits contacts the wellbore wall.

35. The method of claim 29 where the degradable barrier is selected from the group consisting of polylactic acid, polycaprolactams, polyglycolic acid, polyvinyl alcohols, polyalkylene oxides, polyalkylene glycols, polyethylene homopolymers, paraffin waxes comprising solid acids, materials comprising solid acid particles, and combinations thereof.

* * * * *